(12) United States Patent
Badawy et al.

(10) Patent No.: US 11,227,055 B1
(45) Date of Patent: Jan. 18, 2022

(54) SYSTEM AND METHOD FOR AUTOMATED ACCESS REQUEST RECOMMENDATIONS

(71) Applicant: SailPoint Technologies, Inc., Wilmington, DE (US)

(72) Inventors: Mohamed M. Badawy, Round Rock, TX (US); Rajat Kabra, Austin, TX (US); Quoc Co Tran, Houston, TX (US); Jostine Fei Ho, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

(21) Appl. No.: 17/389,497

(22) Filed: Jul. 30, 2021

(51) Int. Cl.
*G06F 21/60* (2013.01)
*G06F 21/62* (2013.01)
*G06N 20/00* (2019.01)
*G06F 16/901* (2019.01)

(52) U.S. Cl.
CPC ........ *G06F 21/604* (2013.01); *G06F 16/9024* (2019.01); *G06F 21/6218* (2013.01); *G06N 20/00* (2019.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,526,785 B1 | 4/2009 | Pearson et al. |
| 7,725,416 B2 | 5/2010 | Buss |
| 8,065,712 B1 | 11/2011 | Cheng |
| 8,209,742 B2 | 6/2012 | Schreiber et al. |
| 8,656,161 B2 | 2/2014 | Nakae |
| 8,683,546 B2 | 3/2014 | Dunagan |
| 9,077,728 B1 | 7/2015 | Hart |
| 9,246,945 B2 | 1/2016 | Chari et al. |
| 9,286,595 B2 | 3/2016 | Taneja |
| 9,288,232 B2 | 3/2016 | Chari et al. |
| 9,516,053 B1 | 12/2016 | Muddu |
| 9,679,125 B2 | 6/2017 | Bailor |
| 9,699,196 B1 | 7/2017 | Kolman |
| 9,787,688 B2 | 10/2017 | Japtap |
| 9,819,685 B1 | 11/2017 | Scott |
| 9,992,230 B1 | 6/2018 | Haverty |
| 10,298,589 B2 | 5/2019 | Cleaver |
| 10,341,430 B1 | 7/2019 | Badawy et al. |
| 10,348,735 B2 | 7/2019 | Anderson |
| 10,432,639 B1 | 10/2019 | Bebee |
| 10,476,952 B1 | 11/2019 | Badawy |
| 10,476,953 B1 | 11/2019 | Badawy |
| 10,523,682 B1 | 12/2019 | Badawy |

(Continued)

OTHER PUBLICATIONS

Notice of Allowance for U.S. Appl. No. 17/101,406, dated Sep. 1, 2021, 7 pgs.

(Continued)

*Primary Examiner* — Craig C Dorais
(74) *Attorney, Agent, or Firm* — Sprinkle IP Law Group

(57) ABSTRACT

Systems and methods for embodiments of graph based and machine learning artificial intelligence systems for generating access item recommendations in an identity management system are disclosed. Embodiments of the identity management systems disclosed herein may utilize a graph based approach, a machine learning based approach, and hybrid combinations thereof for generating access item recommendations.

18 Claims, 15 Drawing Sheets

(56) References Cited

U.S. PATENT DOCUMENTS

| | | | |
|---|---|---|---|
| 10,554,665 B1 | 2/2020 | Badawy | |
| 10,621,368 B2 | 4/2020 | Ravizza | |
| 10,681,056 B1 | 6/2020 | Badawy | |
| 10,791,170 B2 | 9/2020 | Badawy | |
| 10,848,499 B2 | 11/2020 | Badawy | |
| 10,862,928 B1 | 12/2020 | Badawy | |
| 10,938,828 B1 | 3/2021 | Badawy | |
| 11,122,050 B2 | 9/2021 | Badawy | |
| 2002/0026592 A1 | 2/2002 | Gavrila et al. | |
| 2002/0184535 A1* | 12/2002 | Moaven | G06F 21/6218 726/17 |
| 2006/0277341 A1* | 12/2006 | Johnson | G06F 21/629 710/200 |
| 2007/0067845 A1 | 3/2007 | Wiemer | |
| 2007/0226248 A1 | 9/2007 | Darr | |
| 2008/0091681 A1 | 4/2008 | Dwivedi et al. | |
| 2008/0147584 A1 | 6/2008 | Buss | |
| 2008/0288330 A1 | 11/2008 | Hildebrand | |
| 2009/0222894 A1 | 9/2009 | Kenny et al. | |
| 2009/0300711 A1 | 12/2009 | Tokutani et al. | |
| 2009/0320088 A1* | 12/2009 | Gill | G06Q 10/00 726/1 |
| 2010/0082695 A1 | 4/2010 | Hardt | |
| 2010/0274815 A1 | 10/2010 | Vanasco | |
| 2011/0162034 A1 | 6/2011 | Nagaratnam | |
| 2011/0209196 A1 | 8/2011 | Kennedy | |
| 2012/0023576 A1 | 1/2012 | Sorensen et al. | |
| 2012/0216243 A1 | 8/2012 | Gill et al. | |
| 2012/0246098 A1 | 9/2012 | Chari et al. | |
| 2013/0232539 A1 | 9/2013 | Polunin | |
| 2013/0254833 A1 | 9/2013 | Nicodemus et al. | |
| 2013/0283339 A1 | 10/2013 | Biswas et al. | |
| 2014/0207813 A1 | 7/2014 | Long | |
| 2015/0128211 A1 | 5/2015 | Kirner | |
| 2015/0379429 A1 | 12/2015 | Lee | |
| 2016/0203327 A1 | 7/2016 | Akkiraju | |
| 2016/0294645 A1 | 10/2016 | Kirner | |
| 2016/0294646 A1 | 10/2016 | Kirner | |
| 2017/0103164 A1 | 4/2017 | Dunlevy | |
| 2017/0103165 A1 | 4/2017 | Dunlevy | |
| 2017/0103194 A1 | 4/2017 | Wechsler | |
| 2017/0147790 A1 | 5/2017 | Patel | |
| 2017/0220964 A1 | 8/2017 | Datta Ray | |
| 2017/0310552 A1 | 10/2017 | Wallerstein | |
| 2017/0329957 A1 | 11/2017 | Vepa | |
| 2017/0364534 A1 | 12/2017 | Zhang | |
| 2018/0013777 A1 | 1/2018 | DiValentin | |
| 2018/0069899 A1 | 3/2018 | Lang | |
| 2018/0137589 A1* | 5/2018 | Kenthapadi | G06Q 10/10 |
| 2018/0316665 A1 | 11/2018 | Caldera | |
| 2018/0375886 A1 | 12/2018 | Kirti | |
| 2019/0114342 A1 | 4/2019 | Orun | |
| 2019/0349273 A1 | 11/2019 | Rikovic | |
| 2019/0362263 A1 | 11/2019 | Harris | |
| 2020/0007555 A1 | 1/2020 | Jadhav | |
| 2020/0151619 A1 | 5/2020 | Mopur | |
| 2020/0259840 A1 | 8/2020 | Badawy | |
| 2020/0274880 A1 | 8/2020 | Badawy | |
| 2020/0274894 A1* | 8/2020 | Argoeti | G06F 21/6218 |
| 2020/0382515 A1 | 12/2020 | Badawy | |
| 2020/0382586 A1 | 12/2020 | Badawy | |
| 2021/0021631 A1 | 1/2021 | Okutan | |
| 2021/0097052 A1 | 4/2021 | Hans | |
| 2021/0168150 A1 | 6/2021 | Ross | |
| 2021/0174305 A1 | 6/2021 | Schornack | |
| 2021/0287107 A1 | 9/2021 | Badawy | |

OTHER PUBLICATIONS

Sabrina, Fariza, "A Novel Entitlement-based Blockchain-enabled Security Architecture for IoT," 29th International Telecommunication Networks and Applications Conf. (ITNAC), IEEE, 2019, 7 pgs.

Office Action for U.S. Appl. No. 17/180,357, dated Sep. 1, 2021, 11 pgs.

Saltzer, Jerome H. et al., "The Protection of Information in Computer Systems," Proceedings of the IEEE, 63(9), Sep. 1975, pp. 1278-1308.

Bishop, Matt et al., "We have Met the Enemy and He is US," NSPW '08: Proceedings of the 2008 workshop on New Security paradigms, Sep. 2008, 11 pgs.

Frank, Mario et al., "A probabilistic approach to hybrid role mining," CCS '09, Nov. 2009, 11 pgs.

Molloy, Ian et al., "Generative Models for Access Control Policies: Applications to Role Mining Over Logs with Attribution," Proceedings of the 17th ACM Symposium on Access Control Models and Technologies, SACMAT, Jun. 2012, 11 pgs.

Blei, David M. et al., "Latent Dirichlet Allocation," Journal of Machine Learning Research 3, Jan. 2003, pp. 993-1022.

McDaniel, Patrick et al., "Securing Distributed Applications Using a Policy-based Approach," Ann Arbor, Dec. 19, 2003, 48109-2122, 24 pgs.

Chen, Ying et al., "Data Mining and Service Rating in Service-Oriented Architectures to Improve Information Sharing," 2005 IEEE Aerospace Conference, (Version 7, Updated Jan. 27, 2005) Mar. 2005, 11 pgs.

Molloy, Ian, "Automatic Migration to Role-Based Access Control," CERIAS Tech Report 2010-34, Purdue University, IN, Thesis Dissertation/Acceptance, Aug. 2010, 178 pgs.

Ene, Alina et al., "Fast Exact and Heuristic Methods for Role Minimization Problems," SACMAT '08 Proceedings of the 13th ACM symposium on Access control models and technologies, Estes, CO, Jun. 11-13, 2008, pp. 1-10.

Harrison, Michaela, et al., "Protection in Operating Systems," Communications of the ACM, vol. 19, No. 8, Aug. 1976, pp. 461-471.

Li, Ninghui et al., "Access Control Policy Combining: Theory Meets Practice," Proceedings of the 14th ACM symposium on Access control models and technologies SACMAT '09, Jun. 3-5, 2009, 10 pgs.

Schneider, Fred B., "Least Privilege and More," IEEE Security & Privacy, vol. 1, Issue 5, Sep. 2003, pp. 209-213.

Office Action for U.S. Appl. No. 13/970,174, dated Nov. 4, 2014, 22 pgs.

Office Action for U.S. Appl. No. 13/904,350, dated Nov. 14, 2014, 33 pgs.

Office Action for U.S. Appl. No. 13/904,350, dated Apr. 27, 2015, 28 pgs.

Office Action for U.S. Appl. No. 13/970,174, dated Jun. 24, 2015, 16 pgs.

Xu, Wei et al., Taint-Enhanced Policy Enforcement: A Practical Approach to Defeat a Wide Range of Attacks, 15th USENIX Security Symposium, 2006, pp. 121-136.

International Search Report and Written Opinion for International Patent Application No. PCT/US2019/062743, dated Jan. 13, 2020, 6 pgs.

Office Action for U.S. Appl. No. 17/101,406, dated Apr. 27, 2021, 13 pgs.

Lindquist, Jennifer et al., "Effective degree network disease models," Journal of Mathematical Biology, 62, 2011, pp. 143-164.

Office Action for U.S. Appl. No. 17/180,357, dated May 10, 2021, 13 pgs.

Notice of Allowance for U.S. Appl. No. 16/582,862, dated Jun. 21, 2021, 7 pgs.

Notice of Allowance for U.S. Appl. No. 16/998,702, dated Jul. 23, 2021, 10 pgs.

* cited by examiner

|  | IDENTITY | | |
|---|---|---|---|
|  | LOCATION | JOB-TITLE | ROLE |
| USER 1 |  |  |  |
| USER 2 |  |  |  |
| USER 3 |  |  |  |

FIG. 9

| %OWN | ENTITLEMENT | | | | | |
|---|---|---|---|---|---|---|
|  | ROLE 1 | ROLE 2 | ROLE 3 | LOCATION | DEPT | MANAGER |
| ENT 1 |  |  |  |  |  |  |
| ENT 2 |  |  |  |  |  |  |
| ENT 3 |  |  |  |  |  |  |

FIG. 10

SYSTEM AND METHOD FOR AUTOMATED ACCESS REQUEST RECOMMENDATIONS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to the application of artificial intelligence to recommend the addition or removal of access items in a distributed and networked computing environment. Even more specifically, this disclosure relates to identity management systems disclosed herein may utilize a graph based approach, a machine learning based approach, and hybrid combinations thereof for generating access item recommendations.

BACKGROUND

Identity Management (IM), also known as Identity and Access Management (IAM) or Identity Governance and Administration (IGA) is the field of computer security concerned with the enablement and enforcement of policies and measures which allow and ensure that the right individuals access the right resources at the right times and for the right reasons. IM addresses the need to ensure appropriate access to resources across increasingly heterogeneous technology environments and to meet increasingly rigorous compliance requirements.

In a typical identity management system, the system grants access to relevant access items to various identities, in response to an access request. An access request may be the formal process in enterprise identity governance, to grant an access entitlement (typically for the first time) to an identity. Usually, the manager of the identity, or the entitlement owner will make a decision to approve or deny the requested entitlement(s) to the said identity. An access request can originate from the identity, a manager of the identity, or from the system itself, for example.

While the process of submitting and approving or denying access requests achieves the desired results, productivity can be sacrificed due to the time needed for identities to be granted access to access items, and due to the time needed for identities, managers or entitlement owners to determine that a particular identity or group of identities should have access to access items.

It would be desirable to boost productivity by streamlining the process of determining which access items should be added (or removed) from a given identity. To assist in boosting productivity and maintaining the robustness and accuracy of an access model, it would be helpful to enhance the process of generating access requests by the system continually recommending to add (or remove) access items to identities.

SUMMARY

Accordingly, to address these issues, among other ends, embodiments of the identity management systems disclosed herein may utilize graph database queries and/or advanced machine learning models to automatically generate access recommendations for target identities.

In some embodiments, a query approach may be utilized to generate access recommendations for an identity. In such a query approach generally, an access item may be recommended to an identity based on related identities that may have access to the access item. Thus, for a particular identity, the number of related identities (e.g., in the same team, division, group, etc.) with access to an access item can be evaluated to determine a confidence score based on how many of these related identities that have the access item are strongly related peers to the particular identity. If that confidence score is high enough (e.g., above some threshold confidence score) then that access item may be recommended to that particular identity. Specifically, in one embodiment, a set of strong peer identities to a target identity can be determined based on attributes of the peer identities and the target identity. The set of strong peer identities that have access to an access item can be determined. Based on the number of these strong peer identities that have such access, a confidence score can be generated. If the confidence score is above (e.g., or reaches) a threshold value, a personalized access recommendation for that access item may be generated for the target identity.

Embodiment of such a query approach to determining personalized access recommendations may also utilize a concurrency measure (e.g., between access items) to determine access items to recommend to an identity. Such a concurrency measure may be a similarity weight representing a degree of similarity between access items. As but one example, the similarity weight could be based on a count of the similarity of some aspect of the access item (e.g., peer identities assigned to the access item, etc.) between the two access items divided by the union of this aspect of the access item (e.g., all the peer identities assigned the access item). For example, in one embodiment, the concurrent measure may be determined via a proper dissimilarity function (e.g., 1−Jaccard). In one embodiment, a similarity measure of binary vectors may be chosen, then the induced dissimilarity $1-d(x,y)$ (e.g., with $d(x,y)$ as a similarity measure) may be used to assign a similarity weight to the access items. Other methods for determining a similarity weight between two access items are possible and are fully contemplated herein.

In one embodiment of a query approach to determining personalized access recommendations utilizing a concurrency measure, a set of peer identities to a target identity can be determined based on the attributes of identities. Access items of the associated with this set of peer identities can then be determined. A concurrency measure (e.g., a Jaccard similarity or other similarity measure) can be determined between those access items. Using this concurrency measure between the access items, a first set of access items having a relatively high concurrency with other of the identified access items can be determined. Generalized access recommendations for the target identity for the first set of access items can then be generated. Moreover, a second set of access items having a relatively low concurrency with other of the identified access items can also be determined. These identified access items, the set of peer identities, and the target identity can be analyzed to generate personalized access recommendations for the target identity.

In various embodiments a machine learning approach may be utilized to generate access recommendations for a target identity. In these cases, identity management data relating to identities and entitlements can be obtained by the identity management system. Feature data can be on these identities and entitlements can be determined from this identity management data. This feature data can then be embedded. Such an embedding may serve to represent the data more concisely or efficiently and thus increase the efficacy or predictive value of any machine learning model trained on such feature data. Thus, this embedded data may be provided as input data to a machine learning model. Using the machine learning model, an output score relating to the confidence that a target identity for an access item can be determined. Based on the confidence, a personalized access recommendation for the target identity for the access item can be determined.

In certain embodiments, an ensemble approach may be utilized to generate access recommendations for an identity. These types of ensemble approaches may utilize a combination of a query approach for generating access recommendations and a classifier approach to generating access recommendations, whereby these methodologies (or the access recommendations produced by each of the approaches) may be combined or evaluated using, for example, a voting or averaging methodology such as majority voting, weighted voting, simple averaging, weighted averaging or another type of ensemble methodology.

Accordingly, in some instances of an ensemble approach, identity management data relating to identities and entitlements may be obtained. Feature data corresponding to the identities and entitlements can be determined. This feature data can be utilized in association with a graph database query to determine whether a target identity in the identity management system should have access to access items. The feature data can also be applied to a machine learning model trained to determine whether the target identity should have access to access items. Based on a combination of the outputs of the graph database query and the machine learning model (e.g., combined by some ensemble methodology), personalized access recommendations for the target identity for one or more access items can be determined.

In response to generated personalized access recommendations, a target identity may submit an access request to the identity management system for access to the access item. In response to an access request, the identity management system will initiate an approval process for access to the access item by the target identity.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 9 illustrates tabular data of identity features.

FIG. 10 illustrates tabular data of entitlement features.

DETAILED DESCRIPTION

Figure 1:
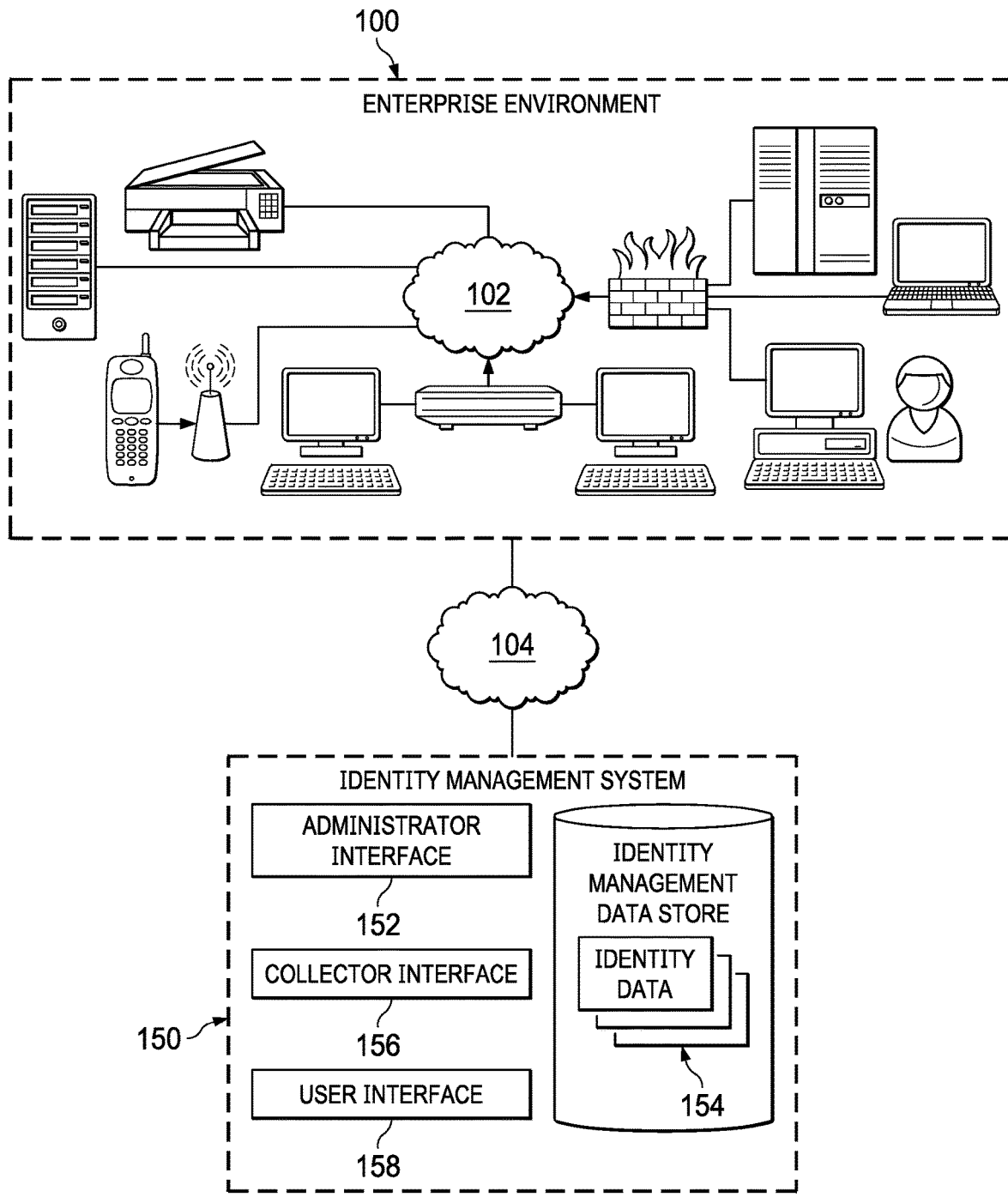
FIG. 1 depicts a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls.

To assist in implementing security measures and access controls in an enterprise environment, many of these enterprises have implemented Identity Management in association with their distributed networked computer environments. Identity Management solutions allow the definition of a function or an entity associated with an enterprise. An identity may thus represent almost physical or virtual entity, place, person or other item that an enterprise would like to define. Identities can therefore represent, for example, functions or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual entity, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

To facilitate the assignment of these entitlements, enterprises may also be provided with the ability to define roles within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity or identities to which users within the enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Typically, a manager or an access entitlement owner may be presented with an identity and an associated entitlement and asked to approve or deny the assignment of the entitlement to the identity. Some Identity Governance and Administration (IGA) industry solutions provide these managers and access owners with bulk approval mechanisms to help automate these certification events by making it feasible for these managers to issue multiple approve/deny decisions. Some solutions provide a decision support agent that can be used to recommend approval or denial for an access request (e.g., an identity entitlement pair) that may be applied easily and substantially in real-time in bulk to a large number of these access requests without loss of accuracy or efficacy. For example, commonly-owned U.S. Pat. No. 10,523,682, describes a system for decision support in network identity graph based identity management artificial intelligence systems, and is expressly incorporated by reference herein, in its entirety.

An access request may be the formal process in enterprise identity governance, to grant an entitlement (for example, for the first time or otherwise) to an identity. Usually, the manager of the identity, or the entitlement owner will have to make a decision to approve or deny the requested entitlement(s) to the said identity. In a typical system, an access request can originate from a user associated with an identity, a manager, from the system itself, etc., as one skilled in the art would understand.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities, one or more entitlements, or one or more roles, and associate defined identities with entitlements using, for example, an administrator interface 152. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a capacity, group, process, physical location, individual user or human, or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 100. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 150. A role within the context of the identity management system 150 may be a collection of entitlements. These roles may be assigned a name or identifiers (e.g., manager_1, engineer_level_2, team leader) by an enterprise that designate the type of user or identity that should be assigned such a role. By assigning a role to an identity using the identity management system 150, the identity may be assigned the corresponding collection of entitlements associated with the assigned role.

The identity management system 150 may thus store identity management data 154. The identity management data 154 stored may include a set of entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, roles, entitlements, events or generally preform identity management with respect to enterprise environment 100.

As part of a robust identity management system, it is desirable to analyze the identity management data 154 associated with an enterprise 100. Specifically, It is desirable to group or cluster the identities or entitlements of an enterprise 100 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed.

Peer grouping of the identities within an enterprise (or viewing the peer groups of identities) may allow, for example, an auditor or other person performing a compliance analysis or evaluation to quantitatively and qualitatively assess the effectiveness of any applicable pre-existing polices, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 150 and allow users of the identity management system 150 greater visibility into the roles of the enterprise 100.

When an identity, a manager, the system, etc. determines that an identity should have access to an access item, the access request and approval process can be initiated. This could cause delays and inefficiencies' due to the time involved with the request and approval process. What is desired then, is a system that continually recommends to add (or remove) highly relevant access items (entitlements, bundles (roles/access profiles)) to identities, in order to boost productivity and maintain the robustness & accuracy of the access model. For example, if the system determines that an identity should have access to a particular access item, they system can recommend the access, thus boosting productivity and, in some examples, providing access to access items earlier than what would have been provided in a conventional system.

To that end, among others, attention is now directed to embodiments of an intelligent access request recommender that provides recommendations for access to access items. In some embodiments, the system can continually recommend to add (or remove) highly relevant access items (entitlements, bundles (roles/access profiles)) to identities, in order to boost productivity and maintain the robustness & accuracy of the access model. In other words, the system will recommend access items to identities that the system determines may be of interest or use to the identities. The recommendations can be presented to the users (identities) and/or to managers of identities, for example. In some embodiments, at the user level, when a user logs into a particular page, the user can be presented with recommended items for the respective user. In some embodiments, when a user logs into an access request page to request access items, access items recommended by the system for the respective user will be presented to the user. When a user requests access to a recommended access item, they system can approve (or not) the access items, using any desired approval process.

In some embodiments, the system includes the functionalities of identifying common and unique access items (e.g., roles/entitlements) and identifying and processing new joiner and mover identities (described below). In some embodiments, the system can be combined with other system functionalities such as a certification recommender, role insights, role validation, outlier and anomaly detection, etc., to provide an integrated, autonomous identity governance and administration (IGA) platform.

Embodiments of an intelligent access request recommender can be accomplished using any desired approach, as one skilled in the art would understand. For example, one approach utilizes traditional graph database queries utilizing the graph data structure (described below). Another approach utilizes advanced machine learning (ML) recommender models that infer the access items to recommend based on common attributes (described below). In some embodiments, an ensemble or hybrid approach can use traditional graph database queries utilizing the graph data structure, combined with advanced machine learning (ML) recommender models that infer the access items to recommend based on common attributes (described below). In some embodiments, another approach utilizes a hierarchical scheme (e.g., waterfall), a weighted average, or a generalized ensemble modeling technique to combine the outputs from several approaches and determine the "best" items to recommend, if any are recommended at all.

In some embodiments, multiple types of algorithms can be used with the system. For example, a first type of algorithm is a collaborative filtering system that is used (user-to-user). A second type of algorithm is a content-based filtering system (user-to-item).

Figure 2:
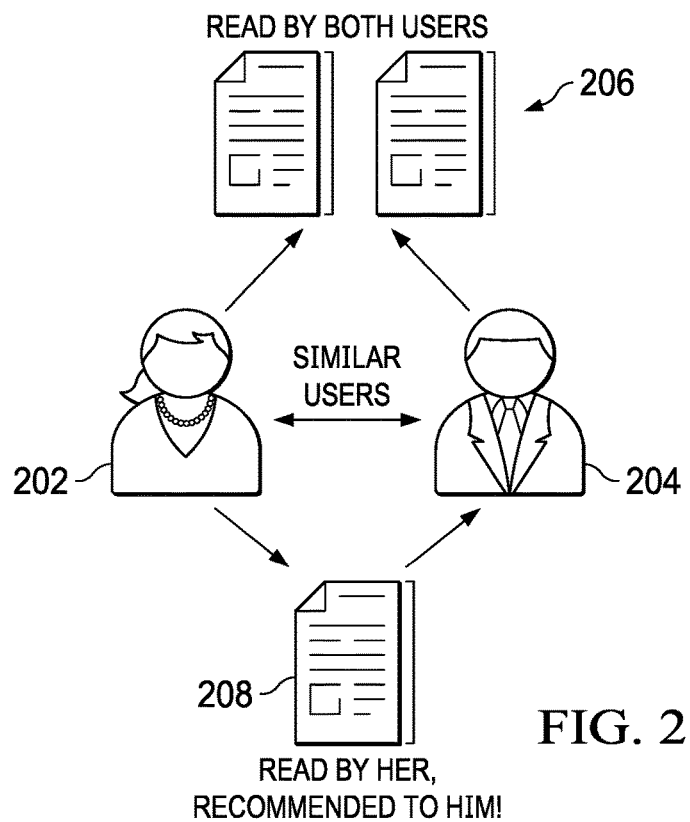
FIG. 2 depicts a block diagram representing an example of collaborative filtering.

Generally, a collaborative filtering algorithm bases recommendations on items accessed by similar users. FIG. 2 is a block diagram representing an example of collaborative filtering. FIG. 2 shows first and second users 202 and 204. The system can determine that users 202 and 204 are similar based on any desired criteria. In the illustration of FIG. 2, both users 202 and 204 have read, or accessed, access items 206. In other examples, similarity of users can be based on groups, business attributes, job titles, department, roles, etc., as one skilled in the art would understand. In the illustration of FIG. 2, the system may recommend access item 208 to user 204, since similar user 202 has read (or accessed) access item 208. Note that the illustration of FIG. 2 is a simple example. Examples with larger groups of users can also be used. Generally, in some examples, collaborative filtering can be implemented in a ML realm using a factorization machine or using matrix factorization techniques, as one skilled in the art would understand.

Figure 3:
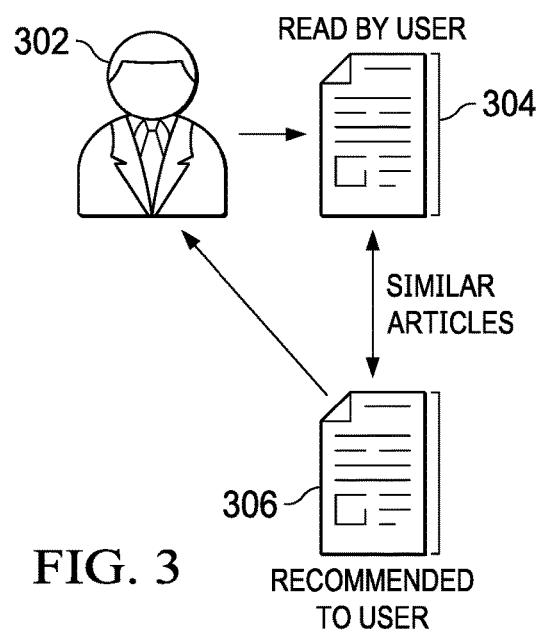
FIG. 3 depicts a block diagram representing an example of content-based filtering.

Generally, content-based filtering bases recommendations on items that are similar to items already accessed by a user. FIG. 3 is a block diagram representing an example of content-based filtering. FIG. 3 shows a user 302 that has read (or accessed) access item 304. The system determines that access item 306 is similar to access item 304, based on any desired criteria. Similarity of access items can be based on document attributes such as document source, related application(s), access level, etc., as one skilled in the art would understand. In other examples, identity attributes can be mapped to the items. For example, it can be determined that X percentage of identities having a particular entitlement share an attribute (e.g., geographic location), and similarity of the item (entitlement) can be determined. In the illustration of FIG. 3, the system may recommend access item 306 to user 302, since access item 306 is similar to access item 204. Note that the illustration of FIG. 2 is a simple example. Examples with larger numbers of items can also be used.

Figure 4:
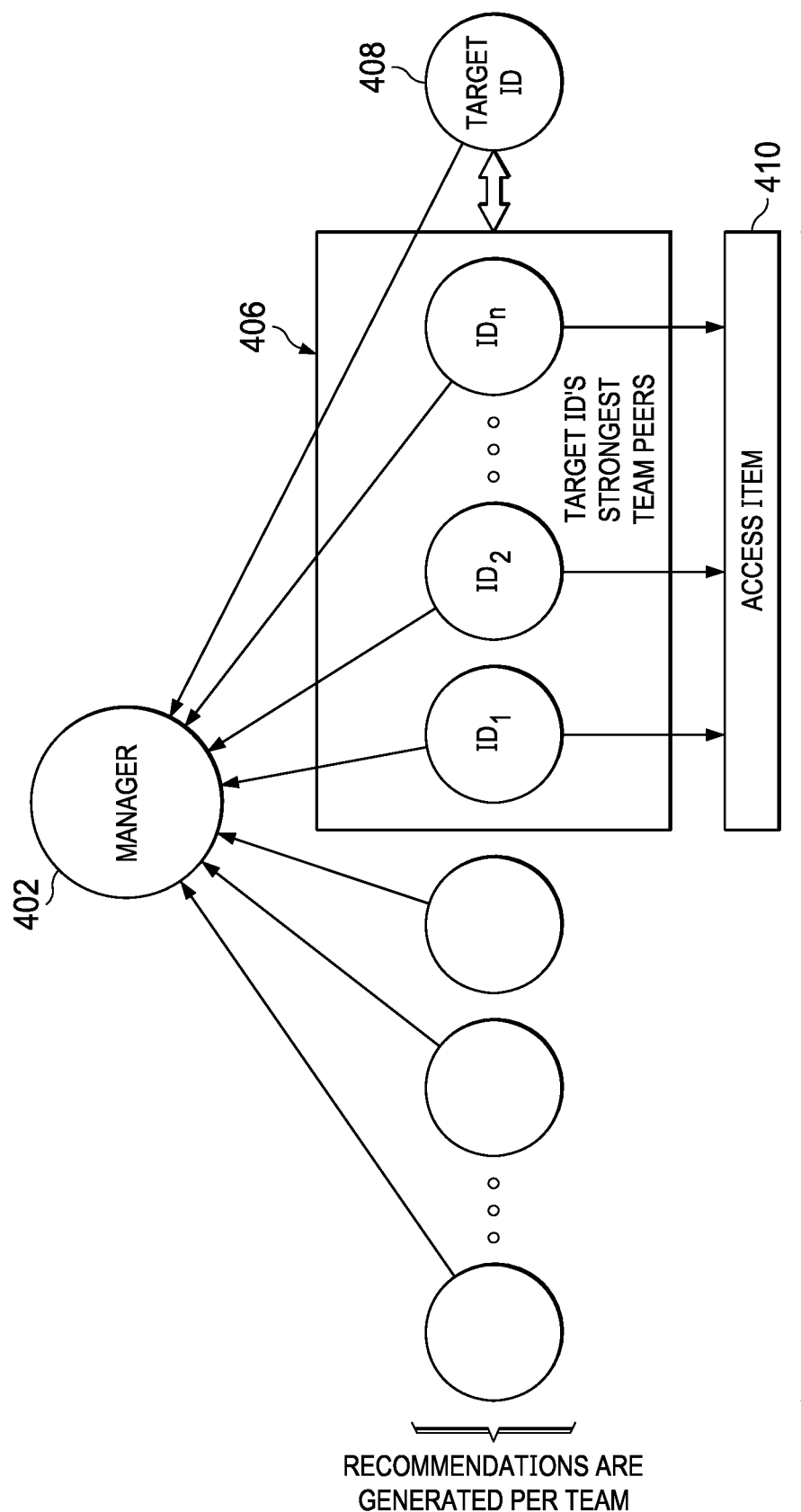
FIG. 4 depicts a diagram illustrating one example of collaborative filtering, utilizing a graph database query approach.

Referring again to collaborative filtering, FIG. 4 is a diagram illustrating one example of collaborative filtering, utilizing a graph database query approach, for example. In this example, as shown on the left portion of FIG. 4, recommendations are generated per team. Typically, in a team environment, a direct manager 402 of a group of identities (a team) will approve (or not) access to access items. FIG. 4 shows a plurality of identities 404 (which are part of the team).

Generally, a sub-set 406 (id1, id2, . . . idn) of the identities 404 are determined to be the strongest team peers to Target id 408 (the identity to which recommendations will be made). This may be determined in any desired manner, as one skilled in the art would understand. For example, this information may already be known by the system. The determination may be based on identity groups, business attributes, job titles, department, roles, etc., or any other attributes. Looking at access item 410, the system determines that some (or all) of peers 406 have access to access item 410, so the system may recommend access to access item 410 to target id 408.

Following is one example of how this may be implemented, for a given access item (e.g., access item 410 in the example of FIG. 4). First, the system will look at a particular team (the identities shown in FIG. 4, in this example) and find the access item support, that is, determines which of the identities 404 have access to the access item 410. Out of the determined access item support, the system determines how many of those identities are strong peers to the target id 408. In the example shown in FIG. 4, the identities 406 are strong peers that have access to access item 410. Based on the number of strong peers 406, a confidence score is generated. If the confidence score reaches a threshold, the system recommends access item 410 to target id 408. The value of the threshold can be any value desired by a designer. This process can be repeated for any given access item. Other examples are also possible, as one skilled in the art would understand.

Figure 5:
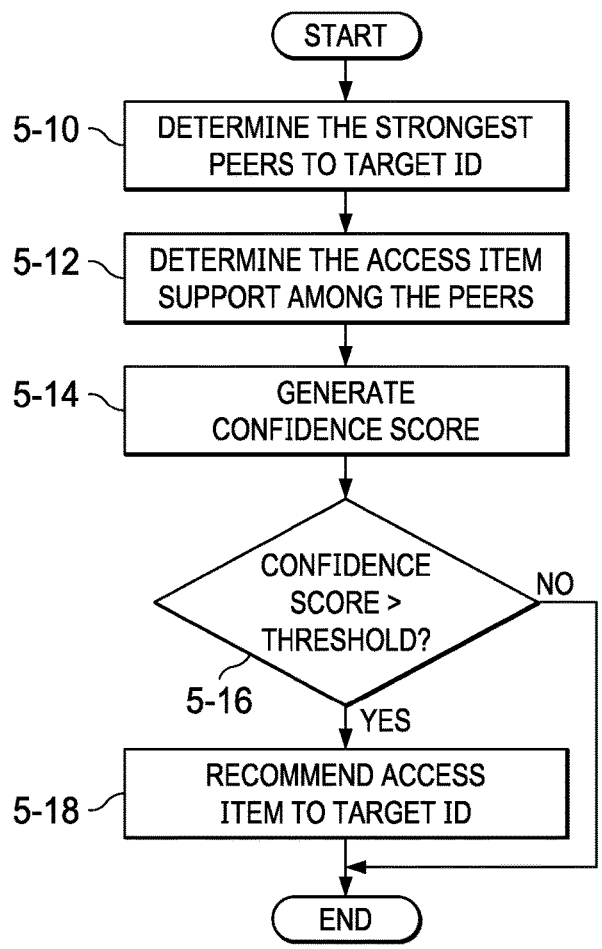
FIG. 5 depicts a flowchart illustrating an exemplary process for recommending a particular access item to a target id using collaborative filtering.

FIG. 5 is a flowchart illustrating an exemplary process for recommending (or not) a particular access item to a target id using collaborative filtering. At step 5-10, the system determines the strongest peers to the target id. This may already be known to the system, or the system can make the determination based on any number of factors. At step 5-12, the system determines the access the access item support, that is, the number of strong peers that have access to the access item. Based on the access item support (e.g., the number of strong peers with access to the access item), a confidence score is generated (5-14). At step 5-16, if the confidence score reaches a threshold value, the system recommends access item 410 to target id 408 (step 5-18). If the confidence score does not reach the threshold, the access item is not recommended to the target id. This process can be repeated for any given access item. Note that some access items will be excluded from consideration and some access items will be recommended generally, as described in detail below. Other examples are also possible, as one skilled in the art would understand.

While access recommendations can be generated as described above, improvements are possible. For example, there are some access items that would otherwise be determined as access items to recommend to the a user using the approach described above but which may not be desirable to include in personalized recommendations to a user. Therefore, prior to (or after) generating recommendations, as described above, it may be desirable to address these types of access items in another manner such that they may not be included in such personalized recommendations for a user. These types of access items may be termed excluded or excludable access items.

A first type of access item that it may be desirable to exclude are what may be deemed common access items. These common access items may be so common across or among identities (e.g., of a particular group) that their recommendation is not desirable in the context of personalized recommendations. This may be, for example, because such common access items may be useful (e.g., Outlook email access, etc.) but not for a specialized job function. Other common access items that it may be less than desirable to personally recommend to a user may be those access items that may be specific to a personal characteristic of a user. For example, certain common access items may involve gender specific access. It may be less than desirable to generate a personalized recommendation to a user for such a gender specific access item to a user.

Thus, these common access items may be excluded from the access items that are personally recommended to a user. It will be noted, however, that while such common access items may not be included in personalized recommendations to user, the user may still be presented with such common access items (and the ability to request such access items). For example, the recommender may provide these common access items in a bulk recommendation in a separate section of an interface or otherwise accessible from a recommendations interface. Such bulk recommendations may be prefaced with general language that indicates these common access items are common amongst other user's while being less personal to the user (e.g., language such as "this access item is common among users" or "you might also be interested in these access items").

In contrast to common access items, another type of access item that it may be desirable to exclude are what may be deemed unique access items. These unique access items may be access items that have a low concurrency (e.g., Jaccard similarity), to other access items. It many cases, the low concurrency of these access items indicates a stable state of these access items and that there may be particular reasons that these access items have such low concurrency. It is thus desirable to exclude these unique access items from recommendations as the recommendation of the access items (and perhaps subsequent granting of that access item) will almost certainly increase the concurrency of that access item with other access items. Such unique access items may include, for example, access items that are highly restricted or privileged or access items that are highly specialized (e.g., exclusive leadership, or higher management access).

Accordingly, in embodiments, access items that have a minimum concurrency (e.g., near zero) or a concurrency value below a threshold value (e.g., a unique access item threshold) may be removed from the access items that are recommended to the user. This may be accomplished by removing these unique access items from even being considered as access items to recommend to a user or by removing any access items determined to be unique access items from the access items determined for recommendation to a user.

Figure 6:
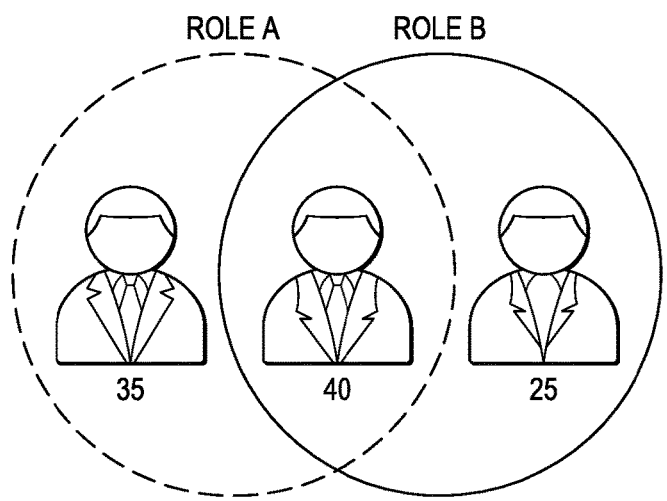
FIG. 6 depicts a Venn diagram showing the correlation between Role A and Role B.

It may be helpful here to discuss concurrency in more detail. As discussed concurrency may measure the similarity between access items. Such a similarity measure may, for example, be a Jaccard similarity or the like. As one example, concurrency of a bundle (or role) measures the correlation between different roles. For example, FIG. 6 is a Venn diagram (of identities) showing the correlation between Role A and Role B. In the example of FIG. 6, the concurrency between Roles A and B is 40% (40 out of 100). Conceptually, the concurrency is the probability of having both bundles, if you have either one. In other words, a common role is a role that does not represent a particular job function. For example, access to showers in a company gym is common, but does not correlate heavily with a particular job function. This concept can be easily generalized for entitlements.

Figure 7:
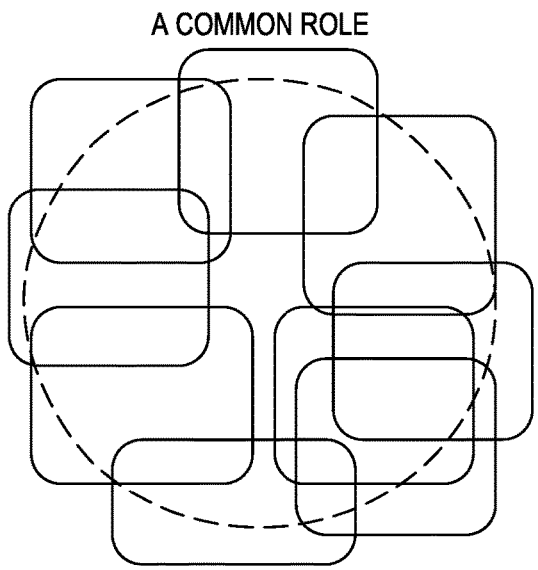
FIG. 7 depicts a Venn diagram of a role that is similar to other bundles.

Referring again to common access items, following is one example of a formulation to determine common access. Common access items include bundles (roles) that are strongly concurrent with a high number of other bundles. For example, FIG. 7 is a Venn diagram of a role (represented by the circle) that is concurrent with a high number of other bundles (the rectangles). The strength can be quantified by being greater than a threshold. For example, a strong concurrency may be defined as having greater than a certain threshold (e.g., in one embodiment 50%, in another embodiment 70%) concurrency with "too many" other access items. Such a strong concurrency determination may utilize a Tukey's criteria or the like. For example, this high number of other bundles is defined as conc.>Q3 of the trimmed (e.g., truncated) distribution (outliers removed) of the pruned (to same concurrency strength) concurrency graph degrees, in addition to the outliers. It will be noted that other embodiments may utilize other methodologies for determine such strong concurrency with a threshold of other access items. For example, the tags assigned to such access items may be correlated to determine strength of concurrency with other access items. Other methods of determining such strength of concurrency may be utilized and are fully contemplated herein.

Referring again to unique access items, following is one example of a formulation to determine unique access. Unique access refers to bundles that are weakly concurrent or not concurrent with any assignable roles (singletons). A role concurrency graph uses roles as nodes, edge weights as role concurrency. On the role concurrency graph, a role with no concurrency is represented by an isolated node (singleton). A weakly concurrent role can be identified as one with a max(concurrency)<threshold. Once both common and unique access items have been excluded, we proceed with the typical recommender algorithm (discussed above), e.g. (collaborative filtering, model approach, or hybrid approach.

Figure 8:
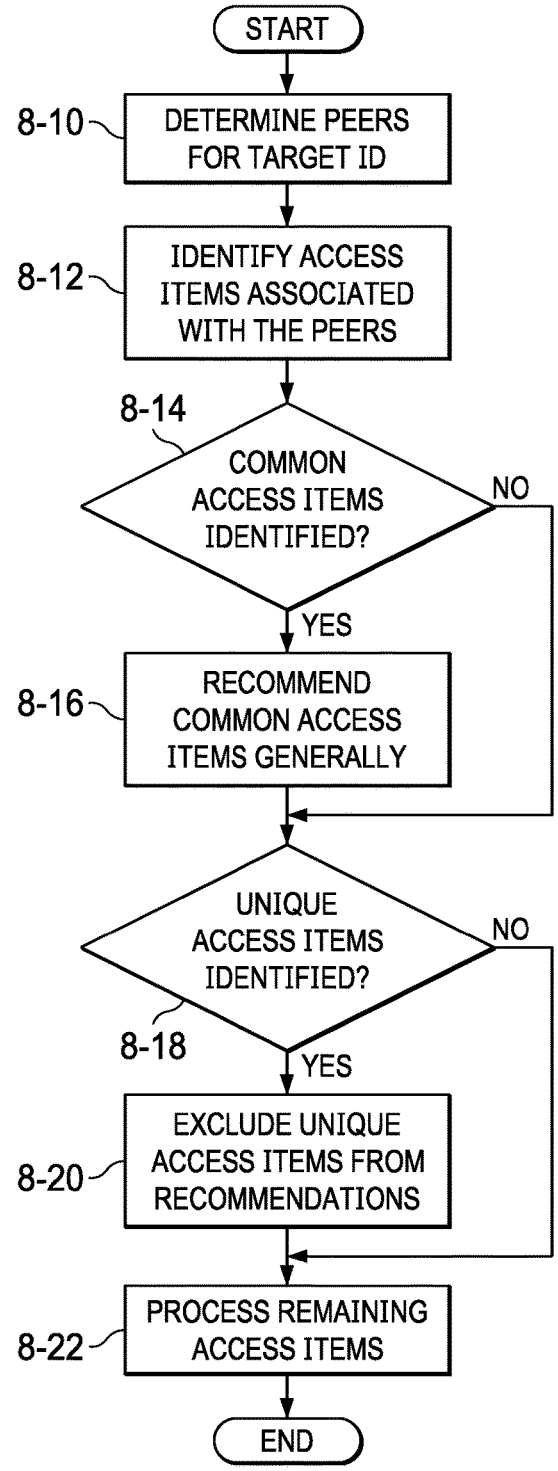
FIG. 8 depicts a flowchart illustrating an exemplary process for recommending access items to a target id.

FIG. 8 is a flowchart illustrating an exemplary process for recommending (or not) access items to a target id using the techniques outlined above. At step 8-10, the system determines a group a peers (e.g., peers 404 in FIG. 4) to the target id (e.g., target id 408 in FIG. 4). At step 8-12, the system identifies access items associated with the determined peers (e.g., like access item 410 of FIG. 4). At step 8-14, the process determines if any access items are common access items (described above). If any common access items are identified, the common access items are recommended generally (rather than a personalized recommendation) to the target id (step 8-16). At step 8-18, the process determines if any access items are unique access items (described above). If any unique access items are identified, the unique access items are excluded from consideration (8-20), and will not be recommended to the target id. Finally, at step 8-22, the remaining access items are processed for consideration of personalized access recommendations (e.g., as outlined in FIG. 5).

In some embodiments, post processing is performed after recommendations are determined by the system. As described above, recommendations are generated per target identity, per team. Since a group of recommended items may comprise a bundle (a group of access items), recommended some access items can be aggregated and coalesced into roles/bundles. In other words, if a bundle (role) comprises ten items, and all ten items are to be recommended, then the bundle can be recommended, rather than the individual items. Then, residual items are recommended as-is. If a sub-set of items from a bundle are to be recommended (e.g., 9/10 items, 8/10 items, etc.), then the system can be configured, as desired to recommend the bundle or not.

In some embodiments, the recommendations are prioritized for consumption by various APIs/products via a confidence score defined as: conf.score=Item_Peer_cnt/Item_Support_cnt. This confidence score is a ratio of the access item peer count (the number of peers having access) over the access item support count (the number of identities having access).

With respect to a new joiner (e.g., a new employee of an enterprise, etc.) or a mover (someone moving from another group), in some embodiments, the recommender can treat these identities in a different way. A new joiner may have no current access and no close peers. Or, if their peers are also new joiners, they may not have any entitlements to speak of. New movers may have peers from a previous team, so the recommendations based on those may not apply. Note that this concern may only be relevant for the collaborative filtering approach.

Regarding new joiners, the system can detect a new joiner in terms of a variable "created_date" (or similar data point or feature) for the id object, then recommend the strict overlap of access items within a new team (i.e., items that every team member has). Movers are treated similarly. A mover may be detected via significant changes to their peer group structure. In some embodiments, a mover is detected by comparing snapshots of their peer group structure at 2 consecutive times. While a mover may have strong peers, they may be from a former team, therefore will be treated like a new joiner. If desired, after a mover has been detected, the recommender can recommend revoking some or all existing entitlements. For the content-based approach, the ML model should be able to infer new access based on changes in business attributes.

Referring again to content-based filtering, as described above, generally, content-based filtering bases recommendations on items that are similar to items already accessed by a user. In some embodiments, advanced machine learning (ML) recommender models infer access items to recommend based on common attributes. Access item recommendations can be based on document attributes such as document source, related application(s), access level, etc., as one skilled in the art would understand. In other examples, identity attributes can be mapped to the items.

Access item recommendations based on content-based filtering provide several advantages. Recommendations generated by ML recommender models will also not include any personal bias. A system using ML recommender models can be scaled up, as needed, and can be customized for enterprise users. A system using ML recommender models will also reduce the workload of managers and users, which traditionally, have to manually request access to entitlements. In addition, when a user is a new joiner, or a mover (described above) a system using ML recommender models will increase productivity of users and managers. For example, the recommender can teach or inform users what applications and tools are available to the users.

To develop ML recommender models, a lot of data is desired, including data relating to relationships between identities and entitlements and attributes of identities and entitlements. For example, useful data may include data relating to entitlements previously added and/or removed from identities. With respect to data relating to relationships between identities and entitlements, the data can be obtained from several sources. The first data source is access request data. The system may track all user-initiated provisioning access requests for identities. For example, data regarding user initiated access requests for entitlements, as well as reviewer approval or denial information. A second data source relates to certification items. A role certification lets a user (the role owner, or a specific identity selected by the administrator who set up the certification) review the membership criteria of the role, and the access granted to that role. A third data source relates to delta events. Delta events are logs from the harvesters (which obtain identity management data from one or more identity management systems associated with an enterprise) to track the triggered updates of the access. The delta events may include events where identities have been awarded entitlements or roles. The system also tracks the attributes of all the identities in the company such as manager, name, job-title, ownership of entitlements, bundle belong, etc. Similarly, the system uses data relating to entitlements, which may contain information regarding each access, such as source, access name, the bundle to which it belongs, the role to which it belongs, etc.

When a ML recommender model is applied to a particular entitlement and a particular identity/role, the model needs a label indicating that the entitlement should be recommended to that identity. One approach to generating labels uses a hierarchical approach, to cover cases over a diverse group of organizations. In one example, the system first looks at access request data. If there is little or no access request data, then the system looks at certification item data. Then, the system will look at delta events from the harvesters. As mentioned, the delta events may include events where identities have been awarded entitlements or roles. In some examples, the action of a manager awarding access will be considered a positive recommendation. Similarly, the action of a manager denying, or revoking, access will be considered a negative recommendation, for example.

FIG. 9 illustrates tabular data of identity features for a number of users. In this example, for each user, location, job-title, and role features are included in the table. For simplicity, FIG. 9 shows an example with only three attributes (location, job-title, and role) of the users. Any number of desired features may be included, as one skilled in the art would understand. FIG. 10 illustrates tabular data of entitlement features for a number of entitlements. In this example, for each entitlement, role 1, role 2, role 3, location, department, and manager are included in the table. In some examples, the data in FIG. 10 may include values indicating the percentage of ownership of a given entitlement for the respective attribute. For simplicity, FIG. 10 shows an example with only six attributes (role 1, role 2, role 3, location, department, and manager) of an entitlement. Any number of desired features may be included, as one skilled in the art would understand.

Once a ML recommender model is trained using historical feature training data, the ML recommender model can be used to generate a recommendation for each entitlement for each user, based on these features. For example, using the examples in FIGS. 9-10, for user 1, the ML recommender model would generate a recommendation for each of the entitlements "ent 1", "ent 2", and "ent 3." Similarly, recommendations are also generated for user 2, user 3, etc. In one example, the ML recommender model generates a probability score for each user/entitlement combination. The probability score provides an indication, or a probability, that the respective user should have access to the respective entitlement. If the probability score for a given user/entitlement combination reaches a threshold value, then the ML recommender model will recommend access to the respective entitlement by the respective user. If the probability score for a given user/entitlement combination does not reach the threshold value, then the ML recommender model will not recommend access to the respective entitlement by the respective user. In another embodiment, rather than using the threshold value, the ML recommender model can rank the entitlements by the probability score, and recommend that the respective user have access to the top N entitlements, where N is a number chosen by a designer (e.g., the top 5 ranked entitlements, etc.).

Once the system has the features (e.g., identity features and entitlement features, described above), a labeling process can be developed. In some embodiments, for a label "recommended access" or "1", the system can be based on data corresponding to approved access (from the access request data), approved certification (from the certifications items data), and confirmed changes in delta events. Similarly, for a label "not recommended access" or "0", the system can be based on data corresponding to rejected access, rejected certification, and access that never should belong to an entity.

Figure 11:
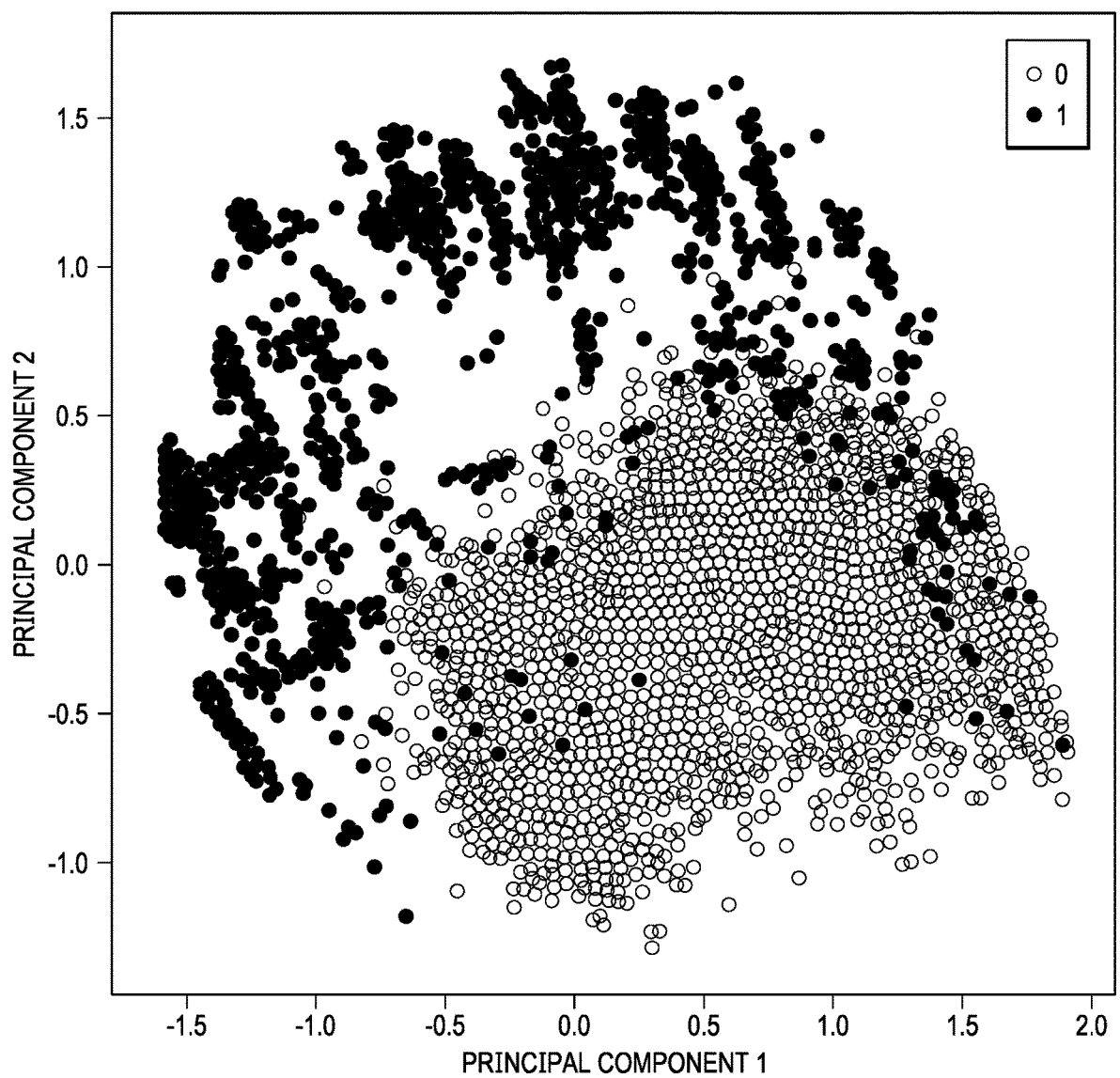
FIGS. 11-12 are visual depictions illustrating typical binary classifications.
Figure 12:
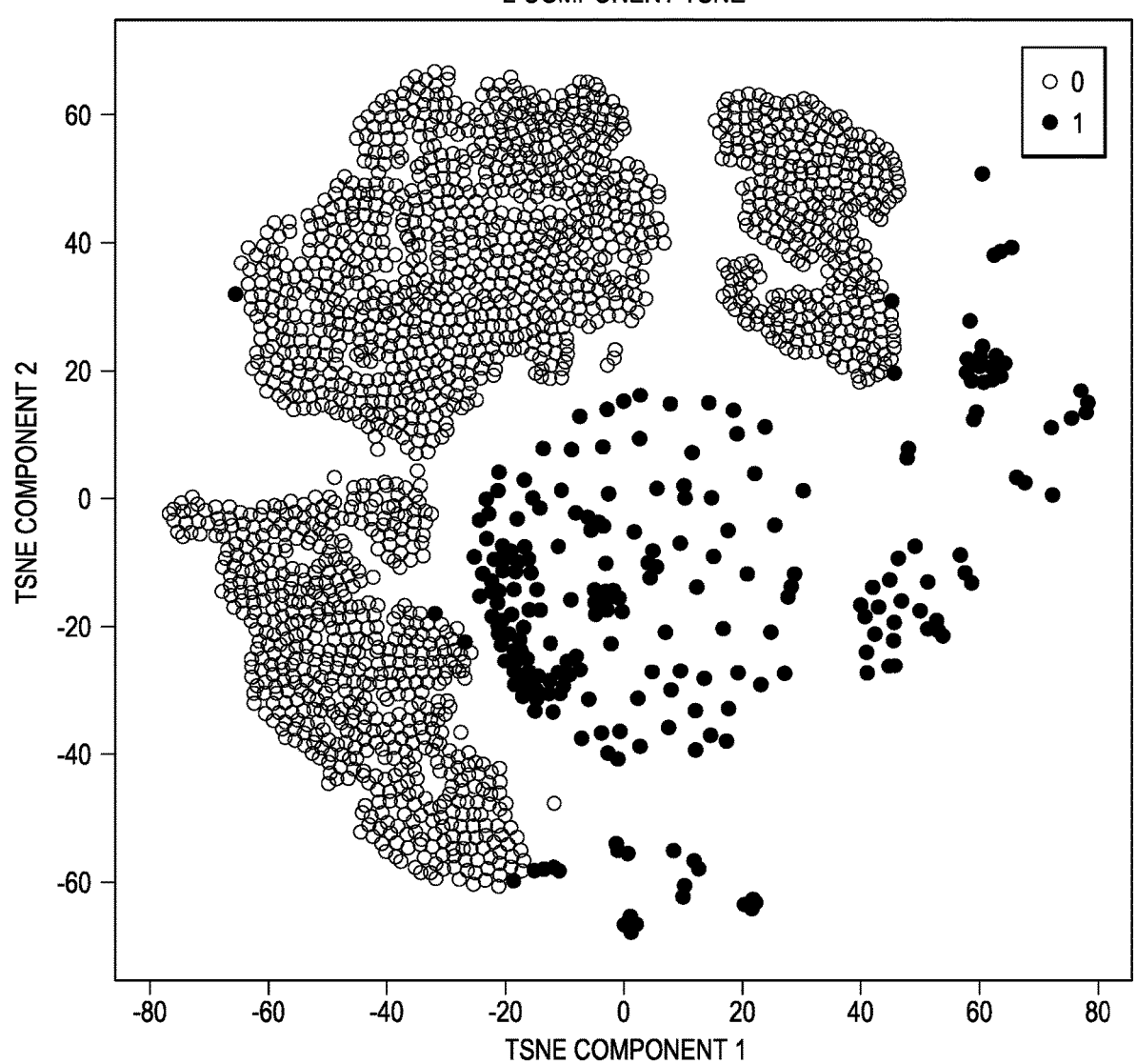
Figure 13:
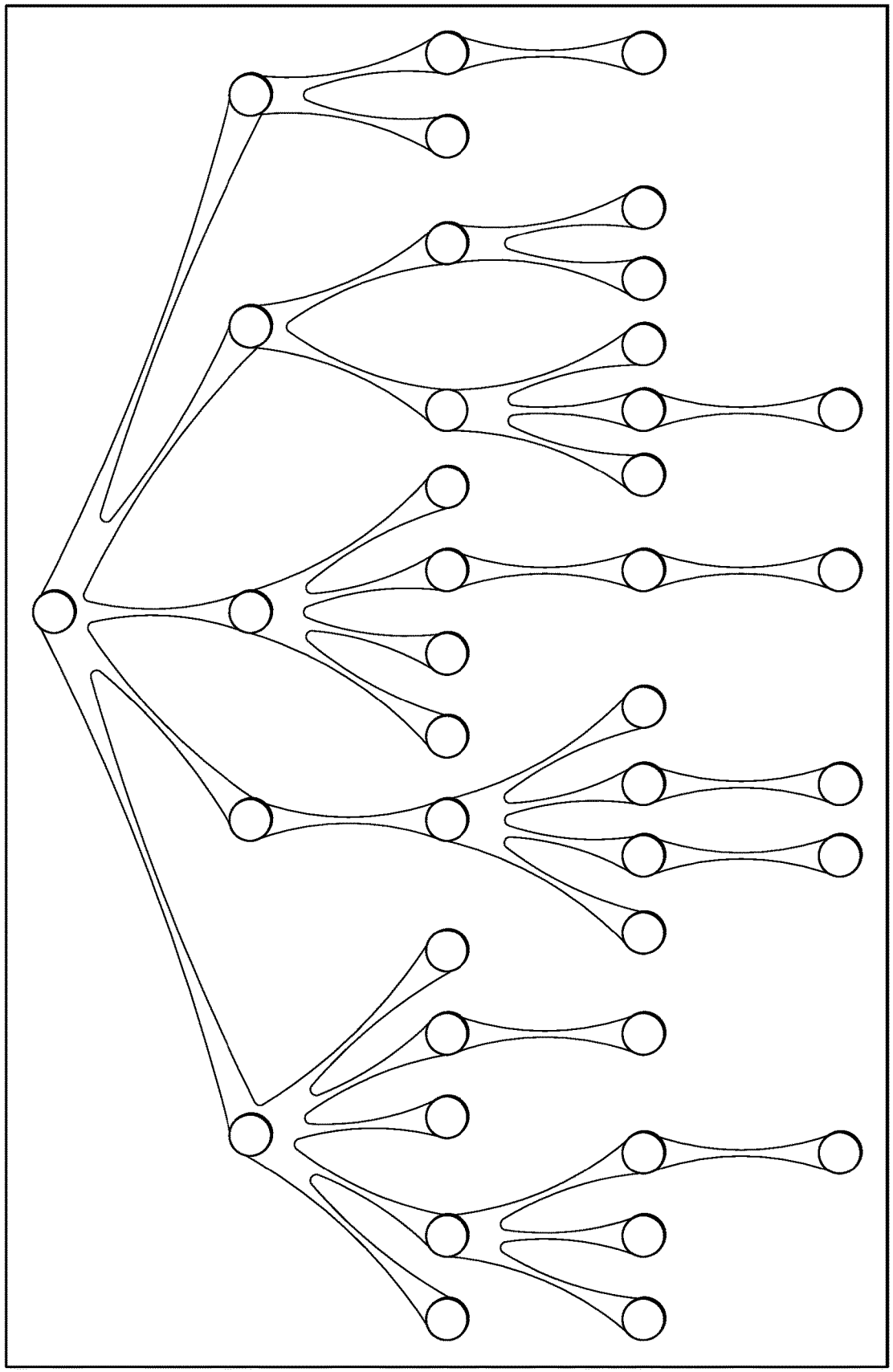
FIG. 13 depicts a visual depiction of a decision tree.

With respect to ML recommender models, the system can be based on any desired type of model, as one skilled in the art would understand. For example, in some embodiments, the models can be based on tree-based algorithms, such as Decision Tree, Random Forest, XGBoost, etc. to achieve a binary classification. FIGS. 11-12 are visual depictions illustrating typical binary classifications based on these types of models. Similarly, FIG. 13 is a visual depiction of a decision tree. Other types of models can be used as well. The selection of model types may be based on various factors, including the number of features, desired performance, etc. For example, when using a relatively small number of features, these types of models will work well.

To improve the performance of the ML recommender models, the system can be based on more sophisticated models such as graph embedding and graph neural network technologies, as one skilled in the art would understand. Also, as more data is available, more sophisticated models may be desired. For example, more features can be extracted if time dependent factors are considered (e.g., specifying "in the past X months" to some of the features). As more features are available, one problem is the complexity resulting from a high dimensional graph, which can be problematic for conventional models to extract features and identify patterns. One approach to address this issue is to transform large graphs to a more condensed format using graph embedding to reduce the number of dimensions. Once embedded, the vectors are used as features.

Figure 14:
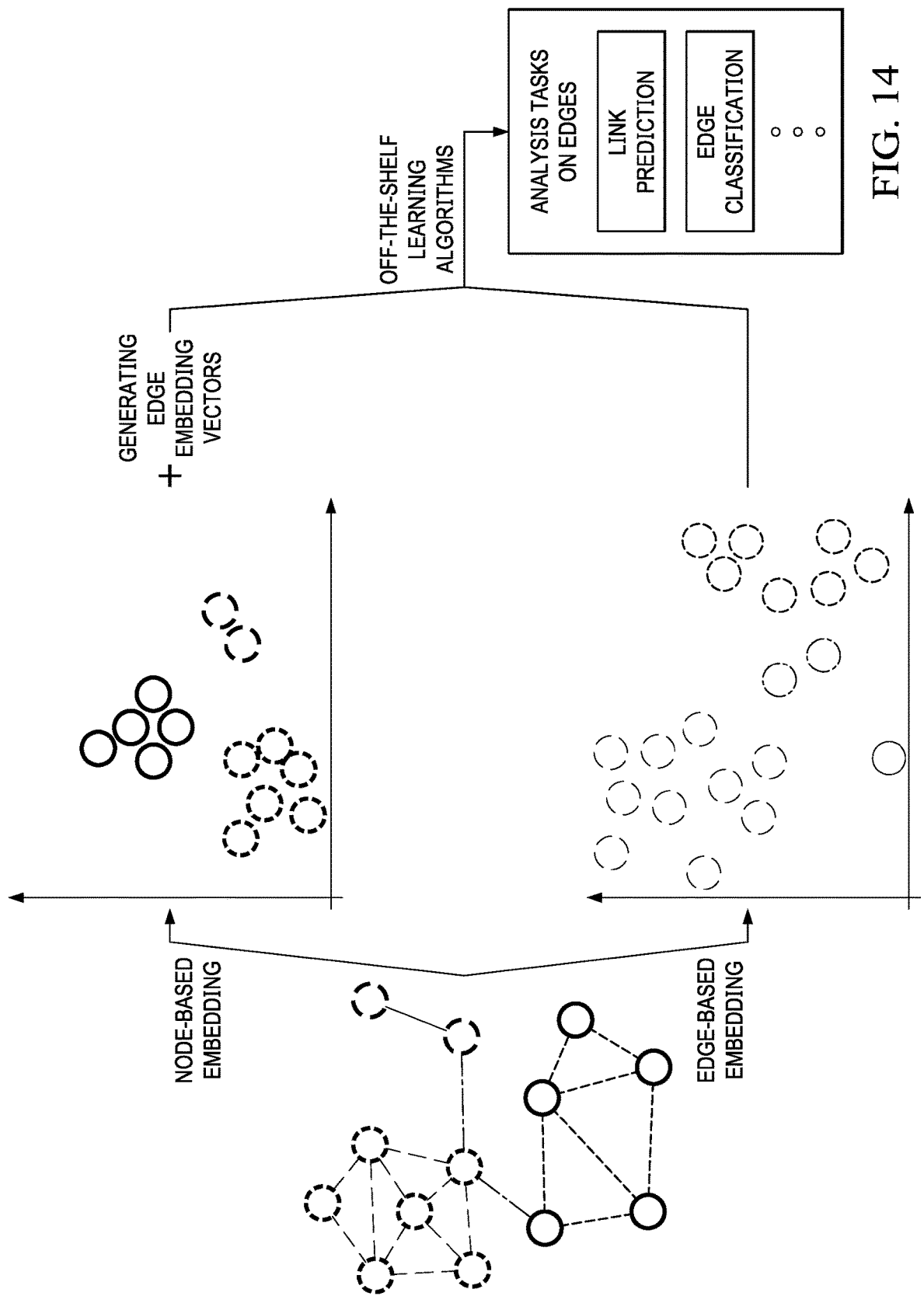
FIG. 14 depicts a diagram relating to node-based embedding and edge-based embedding.
Figure 15:
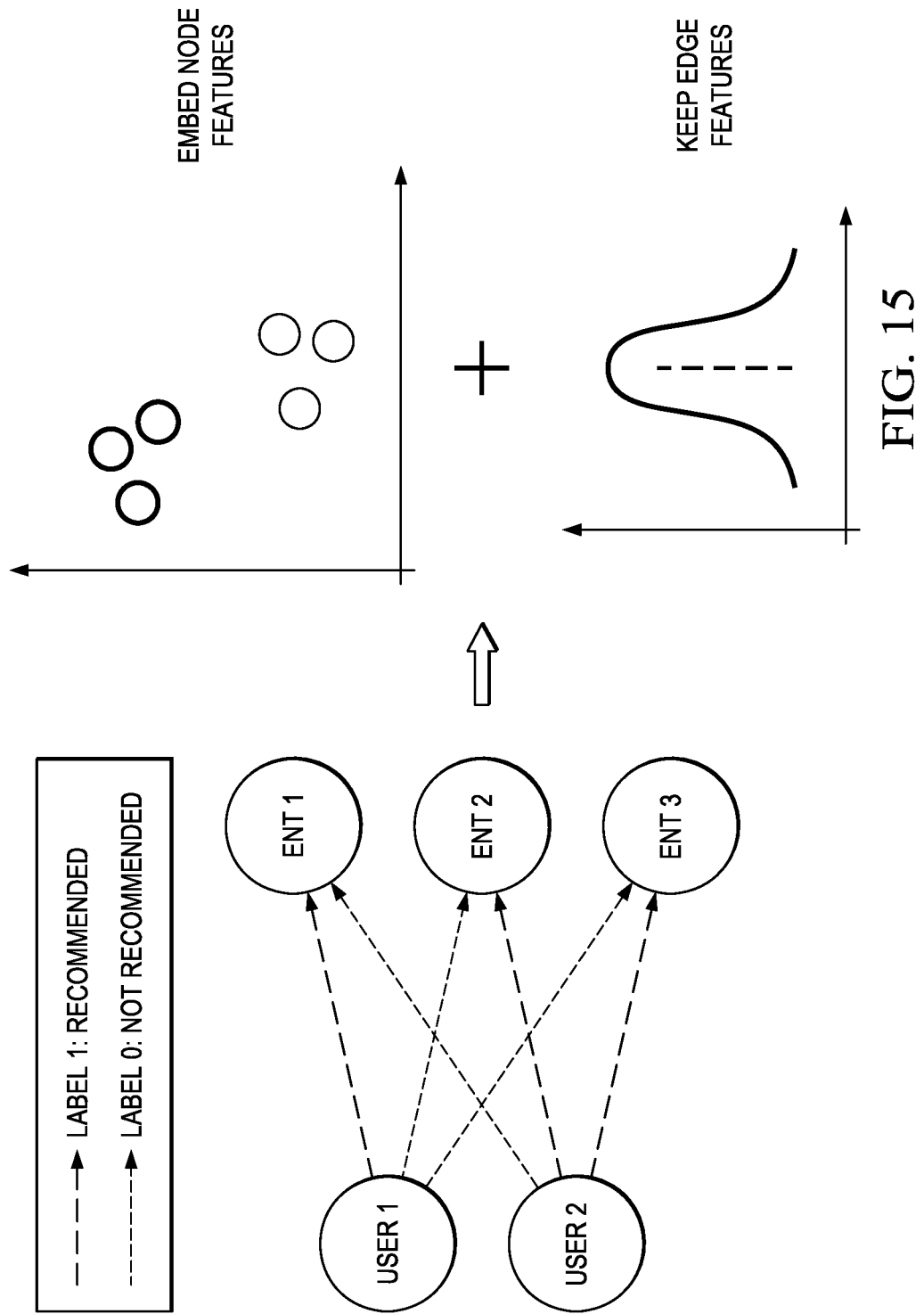
FIG. 15 depicts a diagram of a graph with two identities mapped to three entitlements.
Figure 16:
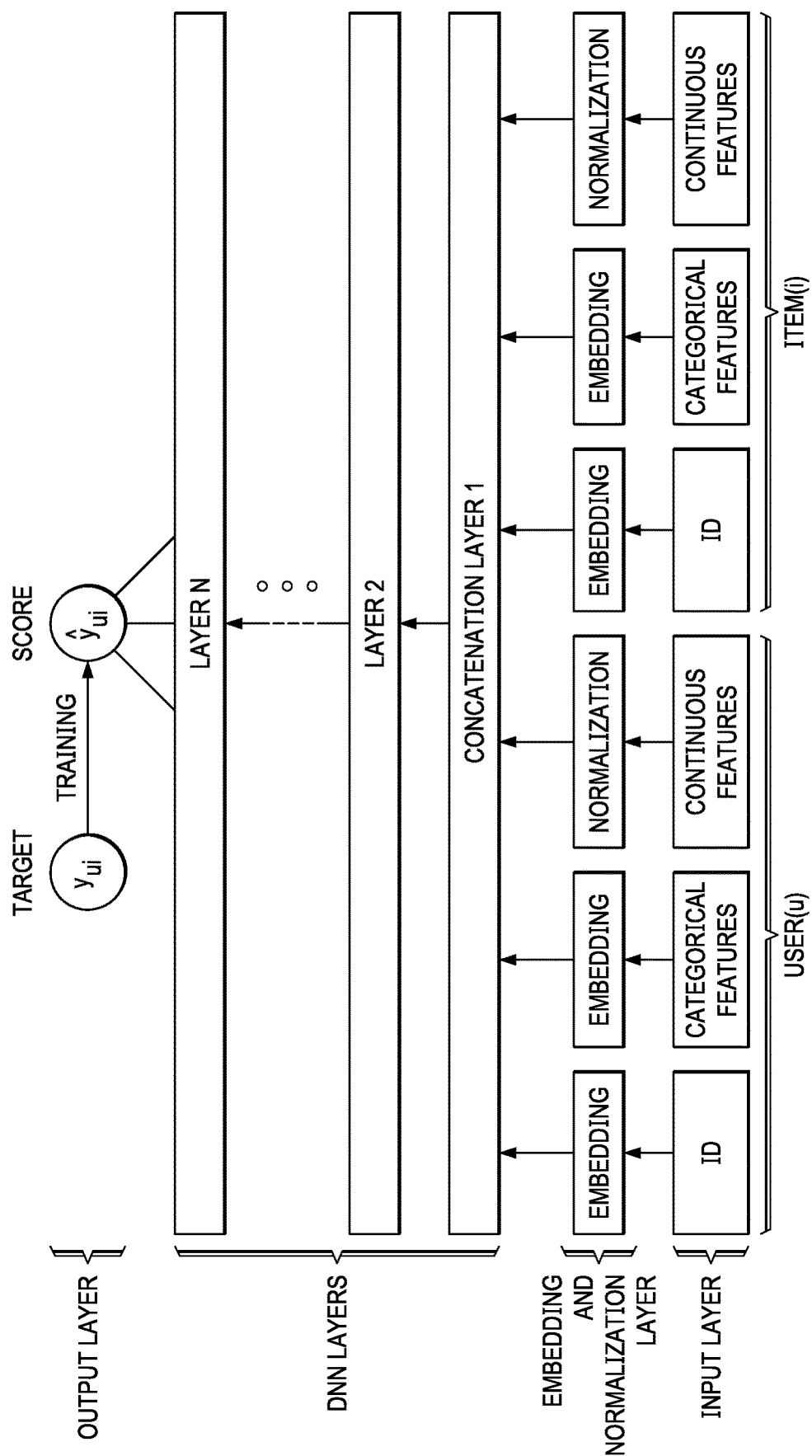
FIG. 16 depicts a general architecture of a deep neural network.

So, in some embodiments, there is a need for performing some type of dimension reduction to reduce the number of features, while keeping the relevant information. Embeddings make it easier for ML models to work with large inputs, as one skilled in the art would understand. FIGS. 14-16 are diagrams illustrating examples of feature embedding. For example, FIG. 14 is a diagram relating to node-based embedding and edge-based embedding. FIG. 15 is a diagram of a graph with two identities mapped to three entitlements. In this example, node features are embedded, while keeping the edge features.

FIG. 16 is a general architecture of a deep neural network (DNN). FIG. 16 shows an input layer, an embedding and normalization layer, deep neural network layers, and an output layer. At the input layer, ID, Categorical Features, and Continuous Features associated with User(u) are provided, as well as similar input for item(i). FIG. 16 illustrates embedding of the users and items. After the embeddings, features will feed into a graph neural network model, which will output a score between 0 and 1 relating to a probability the item being recommended to the user.

Figure 17:
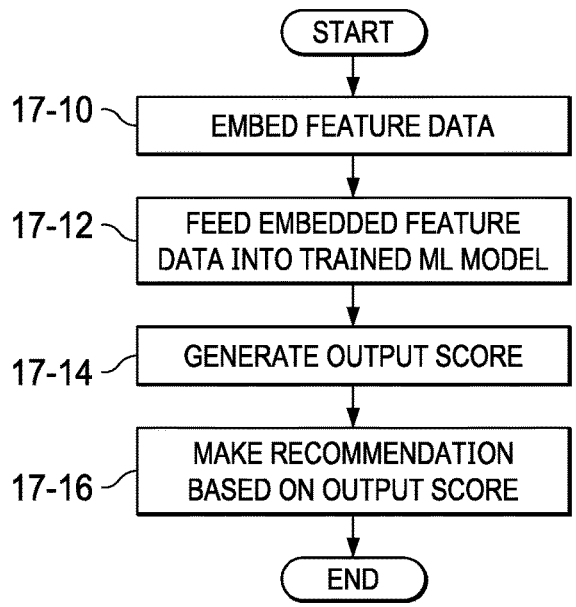
FIG. 17 depicts a flowchart illustrating an exemplary process for recommending a particular access item to a target id using a ML model.

FIG. 17 is a flowchart illustrating an exemplary process for recommending (or not) a particular access item to a target id using a ML model. At step 17-10, feature data is embedded (described above) to transform a large graph to a more condensed format using graph embedding to reduce the number of dimensions. At step 17-12, the embedded feature data is fed to the trained ML model. At 17-14, and output score is generated by the ML model. Based on the output score, an access item recommendation is made (or not) to a user at step 17-16. In response (not shown in FIG. 17), the user can request access to the access item, and if approved, access the item.

Over time, it will be desired to maintain and continue training the models. Generally, in response to detecting that the data has drifted, an incremental training method is applied. Data drifting can result from numerous reasons. For example, data drifting can occur when new data is significantly different than old data. In another example, data drifting can occur when old patterns are no longer valid (e.g., new type of entitlements). Data drifting also happens over time, due to changing policies. Data drifting also happens over time in general, due to ever changing dynamics. If data drift is not detected, the drift can cause model failure due to performance loss.

As mentioned, when data drifting is detected, incremental training of the models can be applied as discussed in U.S. patent application Ser. No. 17/180,357 filed on Feb. 19, 2021, by Badawy et al, entitled "System and Method for Incremental Training of Machine Learning Models in Artificial Intelligence Systems, Including Incremental Training Using Analysis of Network Identity Graphs," which is hereby incorporated fully herein for all purposes.

There are several metrics that can be used to evaluate the access request recommenders described above. A first metric is the approval rate of the recommended entitlements/roles. Since recommended access requests will still have to go through an enterprise's approval process, the approval rate will provide a strong indication of the appropriateness of the recommendations. Similarly, the usage frequency of an entitlement after being recommended and approved provides an indication that the appropriateness of a recommendation was proper. For example, if a recommended entitlement is used frequently after being approved, it is more likely that the recommendation was proper. Conversely, if a recommended entitlement is rarely used after being approved, it is less likely that the recommendation was proper or desirable. Ratings of an entitlement from reviewers/users after being recommended and approved will also give a good indication of the appropriateness (or lack thereof) of the recommendation. The user click rates of recommended entitlements will also provide an indication of recommendation appropriateness. Feedback from users can also provide valuable indications of recommendation appropriateness.

To make the recommendation system more usable, the system can provide interpretations of the recommendations to users. For example, the peer ids, max similarity, output from ML model interpretation layer and other stats are generated as part of the output to help explain why a particular item was recommended. The user interface (UI) can feature a method to allow users to request such explanations to help with the approach and ML model's transparency As another example, if a user requests more information about a recommended entitlement, the system can provide detailed information about why access to a particular entitlement was recommended. Two examples of model interpretability tools which can be used for this purpose are LIME (local interpretable model-agnostic explanations) and SHAP (SHapley Additive exPlanations). Either interpretability tool can be used to interpret what features contributed to the generated recommendation, as one skilled in the art would understand. This information may help a user decide whether or not to request a recommended access item. This information may also help a manager or other decision maker in the approval process.

Figure 18:
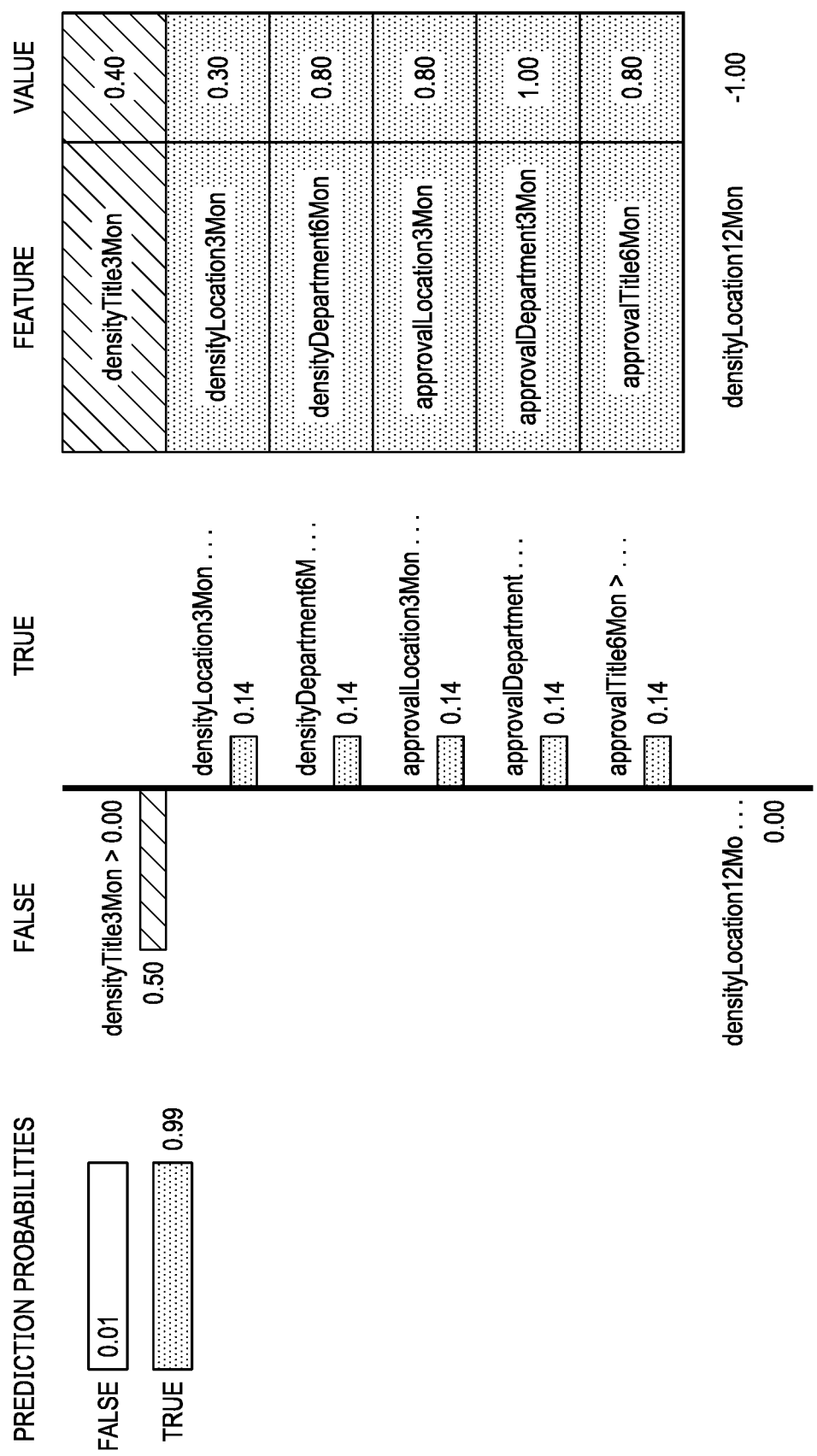
FIG. 18 is an exemplary LIME visual representation.
Figure 19:
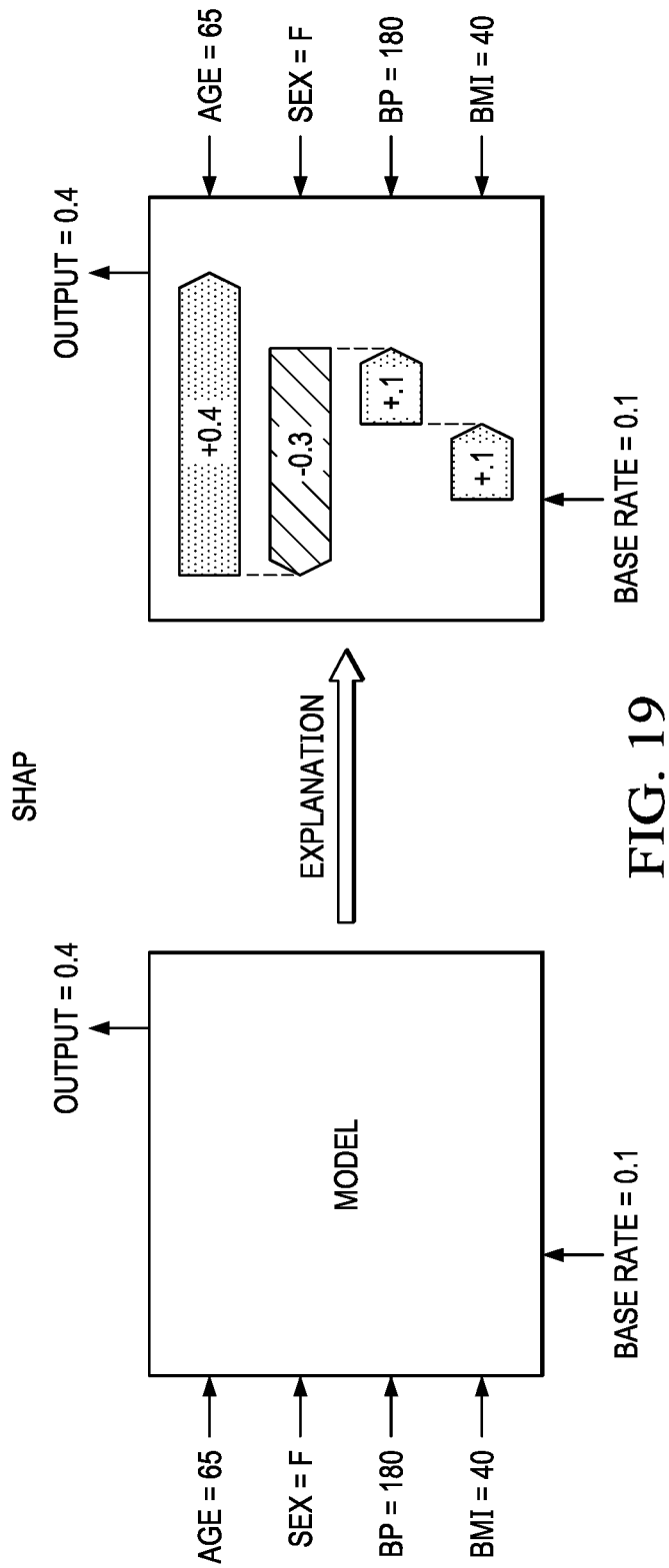
FIG. 19 is an exemplary SHAP visual representation.

LIME can create visualizations, such as the example shown in FIG. 18, which helps users understand what features had the greatest influence in the model's final prediction, and all of the features that contributed to the final prediction score, as one skilled in the art would understand. Similarly, SHAP is mathematical approach that explains the output of a ML model, such as the ML recommender model. While SHAP can create a number of different types of visualizations, FIG. 19 depicts one example of such a visualization. In the example of FIG. 19, the left portion shows a model and its inputs and outputs. The right portion of FIG. 19 shows an explanation of model, including values relating to feature importance for certain features used by the model (in this example, Age, Sex, BP, and BMI).

As described above, embodiments of an intelligent access request recommender can be accomplished using any desired approach, including traditional graph database queries utilizing the graph data structure, advanced machine learning (ML) recommender models that infer the access items to recommend based on common attributes, and hybrid approaches. A hybrid approach can use traditional graph database queries utilizing the graph data structure, combined with advanced machine learning (ML) recommender models that infer the access items to recommend based on common attributes. One example of a hybrid approach utilizes a hierarchical scheme (e.g., waterfall), a weighted average, or a generalized ensemble modeling technique to combine the outputs from several approaches and determine the "best" items to recommend, if any are recommended at all.

Figure 20:
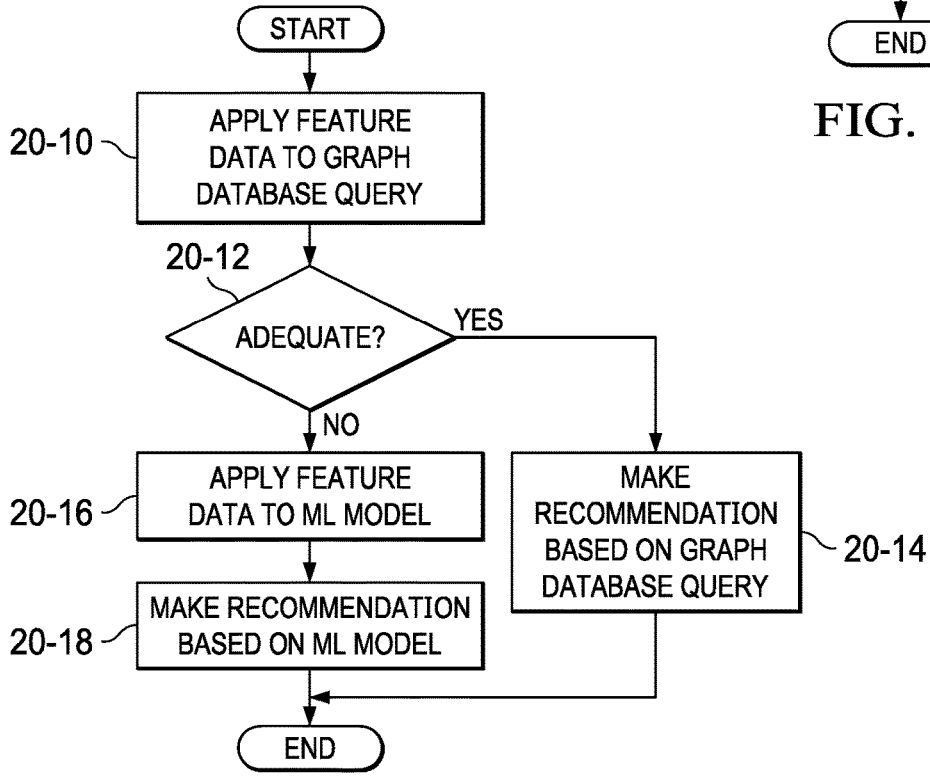
FIG. 20 depicts a flowchart illustrating an exemplary process for recommending a particular access item to a target id using a hierarchical scheme.

In one example, the system first uses graph database queries (described above) to generate an output (recommendations). If this doesn't work, or does not result in satisfactory outputs, then the system moves on to the machine learning approach. FIG. 20 is a flowchart illustrating an exemplary process for recommending (or not) a particular access item to a target id using a hierarchical scheme, as described above. At step 20-10, feature data is applied to a graph database query. If the result of the application of feature data to the graph database query yields adequate results (YES branch of step 20-12), the process proceeds to step 20-14 where a recommendation is made based on the graph database query. If not adequate (NO branch of step 20-12), the process proceeds to step 20-16 where the feature data is applied to a ML model. At step 20-18, a recommendation is made based on the results of the ML model.

Figure 21:
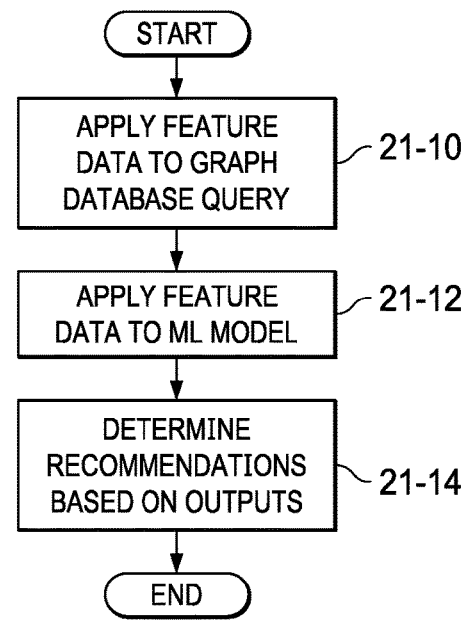
FIG. 21 depicts a flowchart illustrating an exemplary process for recommending a particular access item to a target id using a traditional graph database query and a ML model.

In another example, a weighted average scheme is used by taking an input data set (that was not utilized during training—the model has not seen this data yet), then the data set is applied to both the graph database query and the ML recommender model. Based on the responses of each, optimum weights are chosen that would maximize the utilization of which scheme to use. In another example, different approaches are applied and a "voting" scheme is used. In other words, for a given identity/entitlement combination, the different schemes provide a yes or no recommendation (a "vote"). The votes can simply be counted, and a final recommendation decision is determined based on the votes. Other examples are also possible, as one skilled in the art would understand. FIG. 21 is a flowchart illustrating an exemplary process for recommending (or not) a particular access item to a target id using a traditional graph database query and a ML model. At step 21-10, feature data is applied to a graph database query. At step 21-12 where the feature data is applied to a ML model. At step 21-14, a recommendation is made based on the results of the graph database query and the ML model, as desired. In one example, the weighted average scheme, described above is used at step 21-14. In another example, the "voting" scheme, described above is used at step 21-14. Other hybrid schemes may also be used, as one skilled in the art would understand.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method, comprising:
   determining a set of peer identities to a target identity in an identity management system based on attributes of identities of the identity management system;
   identifying access items of the identity management system associated with the set of peer identities;
   for each of the identified access items, determining a concurrency with other of the identified access items
   identifying a first set of access items of the identified access items, the first set of access items having a high concurrency with other of the identified access items;
   generating a generalized access recommendation for the target identity that the target identity obtain access to the first set of access items;
   identifying a second set of access items of the identified access items, the second set of access items having a insufficient concurrency with other of the identified access items; and
   analyzing the identified access items, the set of peer identities, and the target identity to generate personalized access recommendations for the target identity, each of the personalized access recommendations recommending that the target identity obtain access to a respective access item, wherein the first and second sets of access items are excluded from the generated personalized access recommendations.

2. The method of claim 1, wherein the identified access items, the set of peer identities, and the target identity are analyzed using a graph database query.

3. The method of claim 1, wherein the attributes of the identities include groups, job titles, and departments.

4. The method of claim 1, wherein the determined concurrency relates to the probability of two more identities or groups of identities having access to the same access item or group of access items.

5. The method of claim 1, further comprising, responsive to a generated generalized or personalized access recommendation, receiving an access request from the target identity for access to a respective access item.

6. The method of claim 5, further comprising, responsive to receiving the access request from the target identity, initiating an approval process for access to the respective access item by the target identity.

7. A non-transitory computer readable medium, comprising instruction for:
   determining a set of peer identities to a target identity in an identity management system based on attributes of identities of the identity management system;
   identifying access items of the identity management system associated with the set of peer identities;
   for each of the identified access items, determining a concurrency with other of the identified access items
   identifying a first set of access items of the identified access items, the first set of access items have a high concurrency with other of the identified access items;
   generating a generalized access recommendation for the target identity that the target identity obtain access to the first set of access items;
   identifying a second set of access items of the identified access items, the second set of access items having insufficient concurrency with other of the identified access items; and
   analyzing the identified access items, the set of peer identities, and the target identity to generate personalized access recommendations for the target identity, each of the personalized access recommendations recommending that the target identity obtain access to a respective access item, wherein the first and second sets of access items are excluded from the generated personalized access recommendations.

8. The non-transitory computer readable medium of claim 7, wherein the identified access items, the set of peer identities, and the target identity are analyzed using a graph database query.

9. The non-transitory computer readable medium of claim 7, wherein the attributes of the identities include groups, job titles, and departments.

10. The non-transitory computer readable medium of claim 7, wherein the determined concurrency relates to the probability of two more identities or groups of identities having access to the same access item or group of access items.

11. The non-transitory computer readable medium of claim 7, further comprising, responsive to a generated generalized or personalized access recommendation, receiving an access request from the target identity for access to a respective access item.

12. The non-transitory computer readable medium of claim 11, further comprising, responsive to receiving the access request from the target identity, initiating an approval process for access to the respective access item by the target identity.

13. A system, comprising:
   a processor; and
   a non-transitory computer readable medium comprising instructions for:
   determining a set of peer identities to a target identity in an identity management system based on attributes of identities of the identity management system;
   identifying access items of the identity management system associated with the set of peer identities;
   for each of the identified access items, determining a concurrency with other of the identified access items
   identifying a first set of access items of the identified access items, the first set of access items having a high concurrency with other of the identified access items;
   generating a generalized access recommendation for the target identity that the target identity obtain access to the first set of access items;
   identifying a second set of access items of the identified access items, the second set of access items having insufficient concurrency with other of the identified access items; and
   analyzing the identified access items, the set of peer identities, and the target identity to generate personalized access recommendations for the target identity, each of the personalized access recommendations recommending that the target identity obtain access to a respective access item, wherein the first and second sets of access items are excluded from the generated personalized access recommendations.

14. The system of claim 13, wherein the identified access items, the set of peer identities, and the target identity are analyzed using a graph database query.

15. The system of claim 13, wherein the attributes of the identities include groups, job titles, and departments.

16. The system of claim 13, wherein the determined concurrency relates to the probability of two more identities or groups of identities having access to the same access item or group of access items.

17. The system of claim 13, further comprising, responsive to a generated generalized or personalized access recommendation, receiving an access request from the target identity for access to a respective access item.

18. The system of claim 11, further comprising, responsive to receiving the access request from the target identity, initiating an approval process for access to the respective access item by the target identity.

* * * * *